May 26, 1953 A. C. BROOKEY 2,639,642
VALVE SEAT REAMER
Filed May 17, 1949
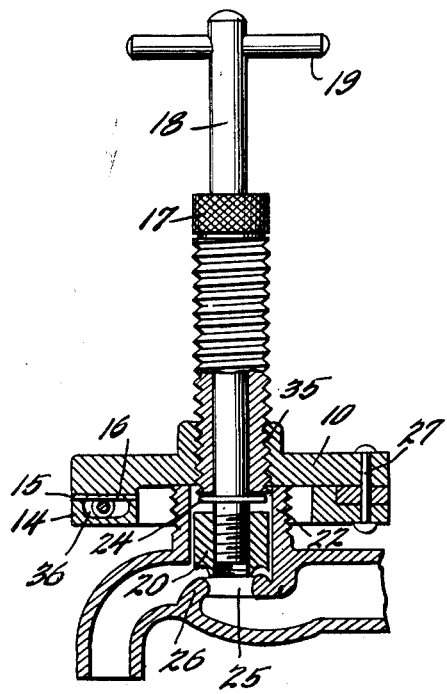
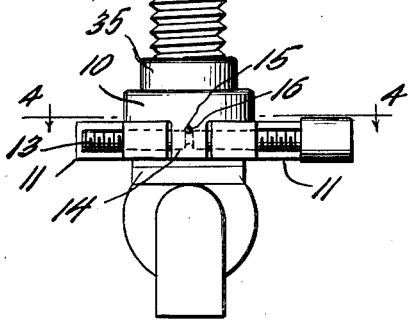
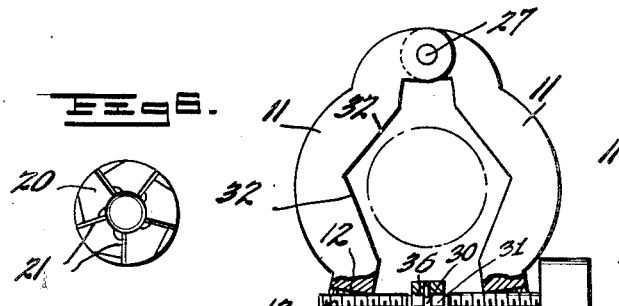
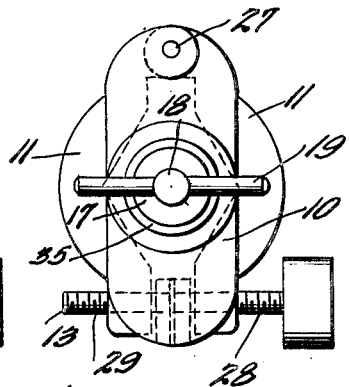
INVENTOR.
Andrew C. Brookey
BY
Watson, Cole, Grindle & Watson
ATTORNEYS Patented May 26, 1953

2,639,642

UNITED STATES PATENT OFFICE 2,639,642

VALVE SEAT REAMER

Andrew C. Brookey, San Antonio, Tex.

Application May 17, 1949, Serial No. 93,753

4 Claims. (Cl. 90—12.5)

This invention relates to cutting tools for refinishing the valve seats of faucets or valves and more particularly to cutting tools of the types specified which are capable of operatively engaging valves and faucets of various shapes and sizes.

For the most part, valve re-seating tools which are provided with universal mountings or adapters which make it feasible to utilize the cutting tool with various sizes of valves and faucets have utilized threaded conical elements which at certain points along the longitudinal axis of the element have a diameter which conforms to the diameter of the threaded portion of the valve housing which the cutting tool is designed to detachably engage for the cutting operation. Adapters of this type, or other similar means, employed to operably attach the cutting tool to the valve housing grip the valve housing limitedly only at the point at which the diameters of the respective engaging and engaged members correspond, and consequently an engagement sufficiently firm to retain the cutting device in position during the cutting operation is not generally obtained. In the instance the valve re-seating tool is provided with a feeding member adapted to apply cutting pressure to the cutting element of the tool and the feeding member is drawn up sufficiently to apply an effective pressure to the cutting element, the limited engagement between the tool and the valve housing cannot generally withstand the force applied and the threads of the housing on which the tool is mounted will be burred or stripped.

Further difficulties are experienced in utilizing a cutting tool of the type described in centering the tool properly with respect to the valve seat which is to be refinished. In most instances the centering of the cutting tool is effected by the element which is employed to operatively engage the internal spindle threads, or the external cap nut threads of the valve housing, or by means of a guide sleeve arranged in such an element. Burred threads on the valve housing, or a deformation in the threaded surface of the valve housing, which is engaged by the tool, will interfere with properly centering of the cutting member, and subsequent working of the cutting tool will cause chattering and uneven working of the valve seat.

One of the objects of this invention is to provide a valve re-seating tool which is adapted for use with valves and faucets of various sizes and forms and which can be easily and speedily assembled in operative position with respect to the valve which is to be re-seated.

A further object of the invention is to provide a universally adaptable cutting tool of the type specified which can be mounted on a valve housing with sufficient rigidity to remain fixed in position when cutting pressure is applied to the associated cutting member without deforming or burring the threaded portions of the valve housing with which the retaining contact is made.

A further object of the invention is to provide a detachably engageable valve re-seating tool adapted for use with valves and faucets of various sizes and forms which automatically and accurately centers the cutting member of the tool relative to the valve seat which is to be refinished. A further object of the invention is to provide a valve re-seating tool in which the cutting element is immediately supported by an adjustable feeder element designed to simultaneously apply cutting pressure to the cutting member and guide the cutting member in the proper plane with respect to the valve seat being refinished. Further advantages and objects of the invention will be apparent from the following detailed description made with reference to the accompanying drawings.

In the drawings:

Figure 1 is a partial vertical section through the cutting tool and through a faucet on which the tool has been assembled;

Figure 2 is an end view of the cutting tool assembly illustrated in Figure 1;

Figure 3 is a plan view of the tool showing the clamping jaws in position in which they firmly engage the faucet on which the tool is assembled;

Figure 4 is a detailed view of the clamping jaws taken along the line 4—4 of Figure 2 illustrating the manner in which the clamping screw is retained in position with respect to the body plate of the tool and the manner in which the conically threaded openings in the free ends of the clamping arm are engaged by the clamping screw;

Figure 5 illustrates the manner in which a clamping arm of the device may be supported in a tapping jig to facilitate tapping the conical recesses provided in the free ends of the clamping arms;

Figure 6 is a detailed plan view of a cutting member which may be employed with the tool; and Figure 7 is a side view of the same element.

In general the re-seating tool comprises a body plate 10 and a pair of co-operating clamping arms 11 which are hingedly supported at one of their respective ends on the body plate 10.

The free ends of the arms 11 are provided with threaded recesses 12 which engage the threaded clamping screw 13 which is passed through the depending lug 14 formed on the bottom of the body plate 10, which lug may be considered as a part of plate 10. The lug 14 is provided with a pin-hole 15 through which is passed a pin 16 which serves to prevent lateral movement of the clamping screw 13 with respect to the body plate as will hereafter be explained in more detail. The body plate 10 is also provided with a boss 35 having a threaded opening centered with respect to the area enclosed by the clamping arm 11 throughout their relative movement which is adapted to receive the externally threaded annular feeder sleeve 17 which may be moved axially with respect to the body plate by rotating the sleeve in the threaded opening of the body plate. The feeder sleeve 17 is provided with a smooth central bore which receives the cutter shaft 18 which shaft at one end supports the handle 19 and at the other end is threaded to receive the annular cutter member 20 which cutter is provided with a series of fluted cutting edges 21 adapted to contact and refinish the valve seat of the valve on which the device is assembled.

In utilizing the device, the cap-nut, valve stem and valve-head of a faucet or valve which is to be re-seated are removed. Preparatorily, the re-seating tool is assembled on the valve housing by rotating the clamping screw 13 in the direction which causes the free ends of the clamping jaws to move away from one another until the clamping jaws are separated to the extent which will permit the tubular upper portion 22 of the housing to fit within the jaws. The cutter element of the device may then be positioned in the housing and the cutting device lowered bodily until the under surface of the body plate 10 rests flush against the upper edge of the tubular portion 22 of the valve housing. When the re-seating device has been thus positioned the clamping screw 13 may be tightened causing the clamping arms to move towards one another and tightly engage the tubular portion 22 of the housing on either side thereof. Thereafter the annular feeder sleeve 17 may be rotated in the direction which causes the sleeve to move axially towards the cutter member 20. The feeder sleeve is moved in the specified direction until the force applied by the lower end of the feeder sleeve bearing against the top surface of the cutter member is sufficient to apply the desired cutting pressure to the cutter member. A thrust washer 24 may be assembled on the cutter shaft 18 between the annular feeder sleeve 17 and the cutter member 20 to provide a suitable bearing surface for the cutter member when it is caused to rotate relatively to the sleeve to effect the refinishing of the valve seat.

When the cutting tool has been thus arranged with respect to the valve which is to be reseated, the handle 19 may be rotated to provide rotary cutting motion to the cutting member 20 which is held in firm engagement with the valve seat by the feeder sleeve 17.

The positive and firm engagement between the housing and the re-seating tool is obtained without threaded connections to the internal spindle threads or the external cap-nut threads of the housing by providing the arms 11 with two rectilinear obtusely intersecting surfaces 32 which intersect to form a shallow V. The surfaces thus formed engage the upper tubular portion 22 of a housing at four points as the clamping screw is turned in the clamping direction and the free ends of the clamping arms are moved towards the lug 14. It will be seen, therefore, that in each instance, irrespective of the diameter of the tubular portion 22 of the housing, the re-seating device will be automatically centered with respect to the tubular portion 22 of the housing and to the valved opening 25 in the partition 26. Uniform equidistant movement of the free ends of the clamping arms 11 with respect to the common hinge joint 27 of the device is obtained by providing the clamping screw 13 with two separate threaded portions 28 and 29 which are right and left hand threads respectively of the same pitch. Rotation of the clamping screw 13 therefore causes corresponding movements towards clamping position of both clamping arms. The depending lug 14 is provided with a transverse opening 36 through which the clamping screw 13 is passed, and a longitudinally disposed pin-hole 15 in which the pin 16 is inserted. The pin 16 rides in a circumferential groove 30 formed centrally in the smooth surfaced portion 31 of the clamping screw 13, whereby lateral displacement of the clamping screw is prevented.

In order to permit limited arcuate movement of the free ends of the clamping arms 11 in response to the rotation of the rectilinear clamping screw 13, the threaded apertures 12 in the free ends of the arms are made conical in form, the narrow ends of the conical recesses being formed towards the mutually facing surfaces of the free ends. When the arms are swung apart about the common pivot 27 to the unclamped position illustrated in Figure 4, the threaded engagement between the clamping screw 13 and the threaded recesses 12 of the arms is maintained along one side of the conical recess only. As the clamping screw is rotated in clamping direction and the free ends of the arms are caused to move inwardly with respect to one another, the threaded engagement between the clamping screw and the threaded conical recesses is shifted gradually to the opposite side of the conical recess. Throughout the movement of the clamping arms in either clamping or unclamping direction, however, a firm engagement is maintained between the clamping screw and the threaded conical recesses provided in the free ends of the clamping arms.

The conical recesses 12 may be formed in the clamping arm by positioning the clamping arm in a suitable tapping jig in the manner illustrated in Figure 5, position A, in which position the surface 33 of the free end of the clamping arm is normal with respect to the axis of a tapping tool 34. The tapping tool may then be lowered to tap through the arm. As the tapping tool is to be withdrawn, the tapping jig is rotated away from its normal position with respect to the tapping tool to a degree determined by the extent of the relative movement between the free ends of the clamping arms which is desired in the assembled device. In most instances, as illustrated in Figure 5, position B, a deflection of 10° from the normal during the tapping operation will provide a suitable range of movement between the clamping arms in the assembled device.

It will be apparent that various modifications and changes may be made in the re-seating tool specifically described herein without departing from the scope of the invention.

It also will be apparent from the foregoing description that the applicant has provided a valve re-seating tool which is adapted to firmly detachably engage various size faucets or valves with which the tool is to be used without deforming, or scoring, or burring the threaded surfaces of the housing whereby replacement of the valve fixtures removed to effect the re-seating is made difficult, and at the same time has provided a re-seating tool which can be simply and quickly assembled in operative relationship with the valve which is to be re-seated. The invention also provides features which automatically center the cutting element of the tool with respect to the valve seat, and positively apply a cutting pressure to the cutting element in a manner which retains the cutting element in the proper plane with respect to the valve being refinished and thereby prevents chattering and uneven working of the valve seat.

Having thus described the invention, what is claimed as new and desired to be secured by Letters Patent is:

1. A detachably engageable valve reseating device comprising, a plate member, a pair of cooperating clamping arms, each pivoted at one of its ends to said plate member for swinging movement into and out of engagement with the housing of a valve to be re-seated, the free ends of said clamping arms each having formed therein a threaded conical recess, a rectilinear clamping screw carried by said plate member at a point remote from the pivotal point of each of said clamping arms and threadedly engaging both said recesses, said plate member being provided with an aperture intermediate the pivotal point of each of said arms and said remote point, a freely rotatable cutting member positioned within said aperture, and means associated with said plate and engaging said screw to prevent lateral movement of said screw with respect to said plate, whereby, when said screw is rotated to draw said arms toward each other into engagement with said valve housing, said cutting member remains equidistant from said clamping arms.

2. A re-seating device as defined in claim 1 wherein said clamping screw comprises separate right- and left-handed screw portions having the same screw pitch, each of which portions engages respectively one of the recesses provided in said clamping arms, whereby said arms are caused to move simultaneously and equidistantly when said clamping screw is rotated.

3. A re-seating device as defined in claim 1 wherein said clamping screw has at least one circumferential notch provided therein for engagement by said plate associated means.

4. A detachably engaging valve re-seating device comprising a plate member, a pair of cooperating clamping arms pivotally attached to one end of said plate member for swinging movement into and out of engagement with the housing of a valve to be re-seated, the free ends of said clamping arms each having formed therein a threaded conical recess, a lug extending from said plate member at a point remote from the pivotal point of said clamping arms, a transverse opening in said lug, a rectilinear clamping screw having separate right- and left-handed screw portions extending through said opening and each of said screw portions threadedly engaging respectively one of said recesses, said recesses having walls converging at an angle of about 10° toward mutually facing surfaces of said clamping arms, whereby, upon rotation of said clamping screw, each arm moves through a 10° arc about said pivotal point, said plate member having a portion intermediate said pivotal point and said remote point defining a threaded aperture, an annular feeder sleeve threadedly engaged therein for axial movement normal to said plate, a cutter shaft extending through said sleeve and freely rotatable therein, and means associated with said lug and engaging said screw to prevent lateral movement of said screw with respect to said plate, whereby, when said screw is rotated to draw said arms toward each other into engagement with said valve housing, said cutter member remains equidistant from said clamping arms.

ANDREW C. BROOKEY.

References Cited in the file of this patent

UNITED STATES PATENTS

| Number | Name | Date |
|---|---|---|
| 400,989 | Wright | Apr. 9, 1889 |
| 407,559 | Wells | July 23, 1889 |
| 582,347 | Dubois | May 11, 1897 |
| 820,866 | Harris | May 15, 1906 |
| 830,110 | Spencer | Sept. 4, 1906 |
| 988,109 | Kaufmann | Mar. 28, 1911 |
| 1,065,408 | Thorsby | June 24, 1913 |
| 1,087,457 | O'Keefe | Feb. 17, 1914 |
| 1,325,278 | Dexter | Dec. 16, 1919 |
| 1,906,350 | Werner | May 2, 1933 |
| 2,139,600 | Parker | Dec. 6, 1938 |
| 2,209,021 | Hawker | July 23, 1940 |
| 2,332,394 | Norton | Oct. 19, 1943 |
| 2,499,658 | Livingston et al. | Mar. 7, 1950 |
| 2,554,283 | Wagstaff | May 22, 1951 |